United States Patent [19]

Schadhauser

[11] Patent Number: 5,757,136
[45] Date of Patent: May 26, 1998

[54] SOCKET AND SOCKET HOUSING FOR AN ELECTRIC LAMP PARTICULARLY FOR A SUSPENDED OR PENDANT LAMP

[75] Inventor: Klaus Schadhauser, Munich, Germany

[73] Assignee: Patent-Treuhand-Gesellschaft F. Elektrische Gluehlampen mbH, Munich, Germany

[21] Appl. No.: 604,421

[22] Filed: Feb. 21, 1996

[30] Foreign Application Priority Data

Mar. 31, 1995 [DE] Germany .................. 195 12 130.9

[51] Int. Cl.⁶ .................................................. H05B 37/02
[52] U.S. Cl. .................... 315/56; 439/620; 362/448; 315/71
[58] Field of Search ................. 315/56, 71; 439/236, 439/226, 227, 228, 620; 361/674, 679; 362/216, 226, 375, 437, 448, 439

[56] References Cited

U.S. PATENT DOCUMENTS

| | | | |
|---|---|---|---|
| 4,570,105 | 2/1986 | Engel | 315/71 |
| 4,982,313 | 1/1991 | Lupien | 362/437 |
| 5,569,981 | 10/1996 | Cho | 315/56 |

FOREIGN PATENT DOCUMENTS 621 742  4/1994  European Pat. Off. .
0 621 742 A  10/1994  European Pat. Off. .

Primary Examiner—Robert Pascal
Assistant Examiner—Michael Shingleton
Attorney, Agent, or Firm—Frishauf, Holtz, Goodman, Langer & Chick, P.C.

[57] ABSTRACT

To provide for reliable interconnection of a cover (4) with the body (1) of a socket and socket housing for an electric lamp which, also, is formed with a receptacle or socket to receive the base of the lamp, preferably a compact fluorescent lamp, a rotary interengaging screw-type connection is provided between the cover and the body. To prevent inadvertent removal, an interengaging snap connection (6, 8) is formed on the cover (4) and on the body, respectively. The snap connection (6, 8) engages upon assembly of the cover (4) with the body (1). To remove the cover (4), a tool such as a screwdriver is engaged through a small slit (16) in the body, to deflect a resilient flap formed by the cover element. A positioning rib (14) is provided within the body to secure the resilient flap in deflected position, even after removal of the tool, to permit easy disassembly of the cover (4) from the body (1) without requiring continued deflection pressure on the resilient flap.

17 Claims, 6 Drawing Sheets

SOCKET AND SOCKET HOUSING FOR AN ELECTRIC LAMP PARTICULARLY FOR A SUSPENDED OR PENDANT LAMP

FIELD OF THE INVENTION

The present invention relates to a combined socket housing and socket for an electric lamp, particularly for a suspended, or pendant lamp, in which the socket housing retains a lamp accessory, or a ballast circuit.

BACKGROUND

Various socket housings to retain electrical operating circuitry for electric lamps are known, and one such housing is described in European patent application 0 621 742 A, Kastl et al, assigned to the Assignee of the present application. In accordance with this disclosure, a housing for an electronic lamp accessory, or ballast circuit is provided which, essentially, is block-shaped and has a bottom part, as well as a top part. The top part has two removable cover caps which are connected to the bottom part by snap connections. The snap connections are accessible from the outside of the upper part of the housing, so that they can be released, for example, by inserting a screwdriver into slits. The screwdriver acts as a wedge and bends a snap flap or strip away from an engagement element, so that the respective cover cap can be removed. The snap catch remains open, however, only so long as the screwdriver, or similar tool is engaged against the snap catch; accordingly, as the cover cap is removed, the screwdriver must be held by one hand to bend back the engagement element, one other hand holding the cover cap for removal. This is awkward and, particularly for suspended fixtures, where work must be carried out, for example on a ladder, potentially hazardous.

THE INVENTION

It is an object to provide a housing and socket structure for an electric lamp, in which the housing is of sufficient size and otherwise suitable to retain a ballast circuit, or accessory circuit for the lamp, and wherein the overall structure has a simple closing mechanism which, still, prevents mere removal by hand without first unlocking a snap catch by means of a tool.

Briefly, the socket and socket housing for the electric lamp, to retain an accessory circuit or ballast for the lamp, has a housing body which includes the lamp socket, closed off by a removable cover. An interengaging rotary connection connects the cover and the body for, selective assembly together, or disassembly. An interengaging snap connection or lock is provided on the cover and body, respectively, the snap connection engaging upon assembly of the cover on the body. A small release opening is formed in the cover or the body, preferably in the body. The slit is located in the region of the snap connection, and permits access to unlock the snap connection, for example by inserting a screwdriver into the release opening.

The term "screw-type connection" includes both a spiral, continuous pitch, or screw-type connection, as well as a bayonet-type connection. Combining such a rotary connection with a snap connection or lock, which can be released only through a small opening, prevents unintended opening of the housing, and severance of the cover from the housing body. Additionally, it provides protection against inadvertent contact with electrical terminals located beneath the cover, and which may be energized at distribution line voltages. Yet, the connection can be released or unlocked simply, by means of a tool, for example a screwdriver.

The rotary connection, in bayonet, or spiral screw form, is preferably formed by a plurality of ribs formed at the inner wall of the housing and the outer wall of the cover, respectively. The ribs can be placed, for a screw connection, along an inclined spiral line on the housing and on the cover, respectively, or, for a bayonet connection along a circular line in the housing or cover, respectively. The size of the ribs and the spacing between ribs on the housing and on the cover, respectively, are so placed that the ribs of the cover can engage between breaks or spacings of ribs in the housing. Thus, the cover can be seated on the housing and coupled therewith by a, for example, one-quarter turn rotation. Further rotation of the cover is preferably prevented by a stop.

The snap connection preferably is formed by a simple resilient hook or spring flap, located in the region of the ribs on the cover and engaging behind a stop projection on the inner wall of the housing. Preferably, the housing body as well as the cover are made of plastic, so that the respective ribs, stops, flaps and projections can be molded or formed on the respective walls of the housing and the cover.

After approximately a one-quarter turn of the cover, for example in clockwise direction, the resilient flap can engage behind the stop projection. At that position, the resilient flap is engageable through a small slit formed in the housing, for example by a screwdriver.

In accordance with the invention, the snap connection, additionally, includes a positioning rib, so located that the resilient flap can be engaged behind the positioning rib upon introduction of the tool into the narrow slit in the housing. By bending the resilient flap inwardly, and upon slight pressure, the resilient flap is located behind the positioning rib, thus completely unlocking the snap connection, and, simultaneously, holding the resilient flap in unlocked position, so that the bayonet or screw connection between the housing and the cover can be readily released by rotation in counter-clockwise direction.

The housing structure, and the particular locking arrangement is especially suitable for housings which are essentially cylindrical, and especially circular cylindrical. The connection is strong and reliable enough to retain a lamp suspended on a cable passing through an opening in the cover, and suitably strain-relieved to absorb the weight of the lamp, ballast, and housing, and possible additions, such as lamp shados, diffusers and the like.

DRAWINGS

DETAILED DESCRIPTION

Figure 1:
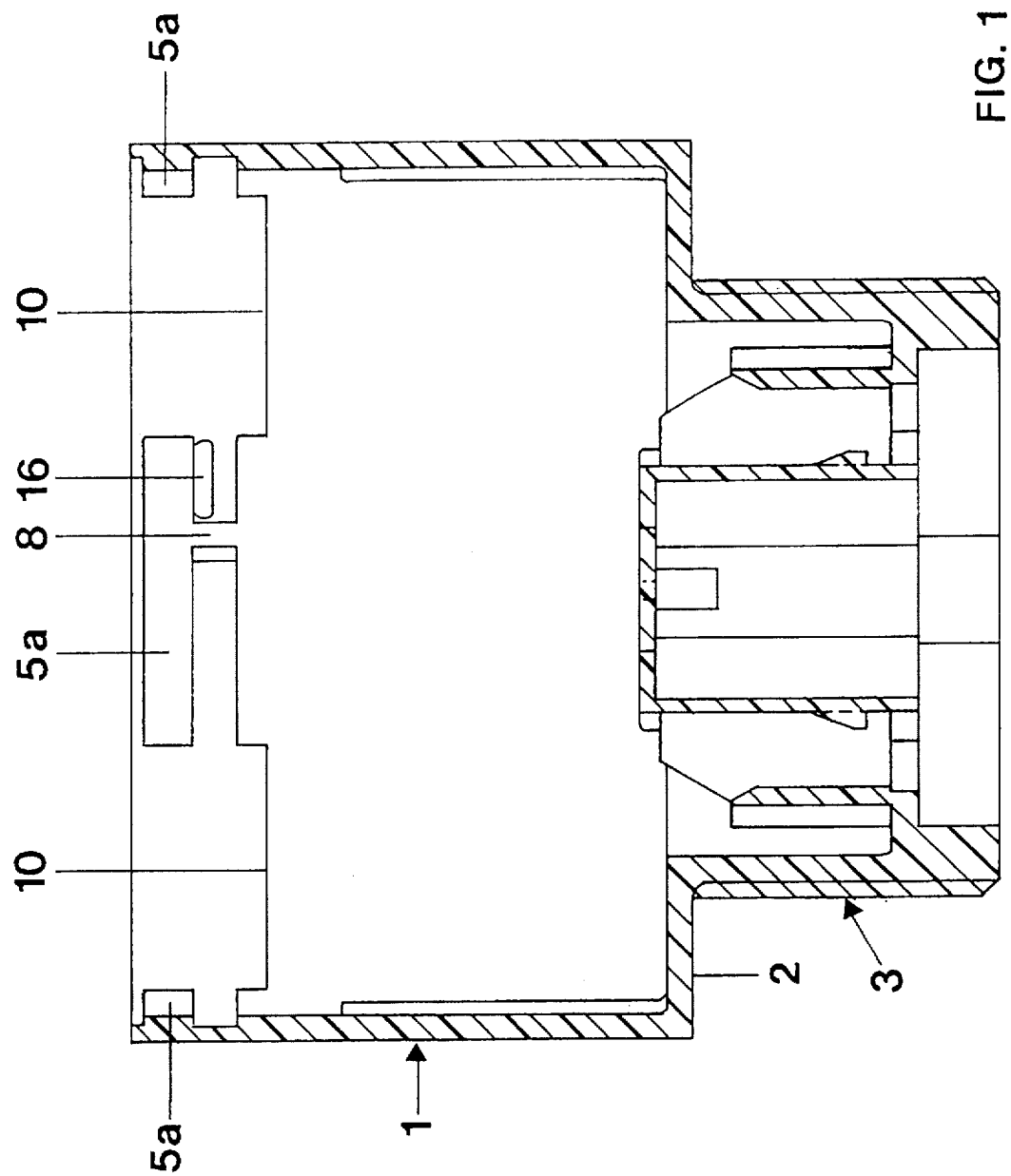
FIG. 1 is a highly schematic cross-sectional view through the housing body of the housing in accordance with the present invention, with the cover removed.
Figure 5:
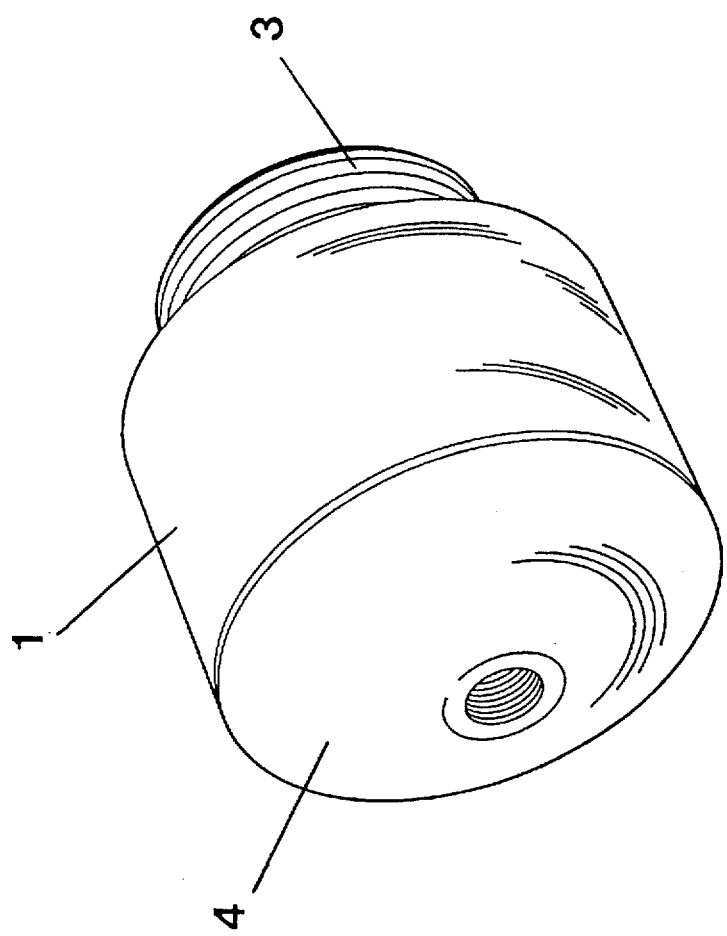
FIG. 5 is a front isometric view of the housing, with the cover in place, but without cable, in accordance with the first embodiment of FIG. 1.
Figure 6:
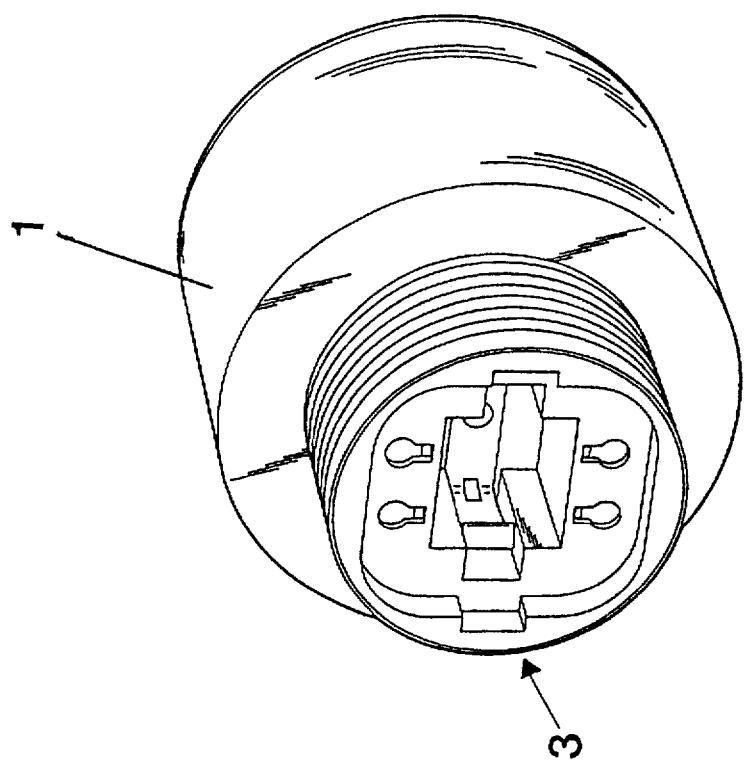
FIG. 6 is a bottom view of the housing, illustrating a plug and socket of the housing for a compact fluorescent lamp.
Figure 7:
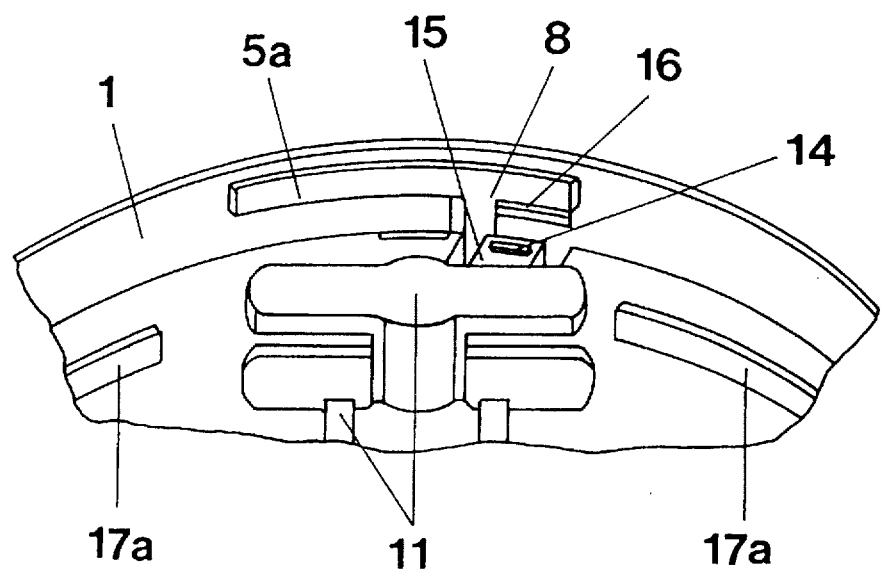
FIG. 7 is a perspective view of the housing in accordance with the embodiment of FIGS. 1 and 4 showing details of the snap-in connection.

The illustration of FIG. 1 is of a particularly preferred embodiment. The socket and socket housing is especially intended to receive compact fluorescent lamps, suspended from a ceiling to form a suspension lamp receptacle. The housing 1 is made of plastic and, for example, and preferably, has essentially circular, cylindrical shape (see FIGS. 5 and 6). The bottom 2 of the housing has a socket 3 formed thereon to receive the base of a compact fluorescent lamp. In one embodiment, the outer diameter of the housing above the socket 3 is approximately 58 mm.

Figure 2:
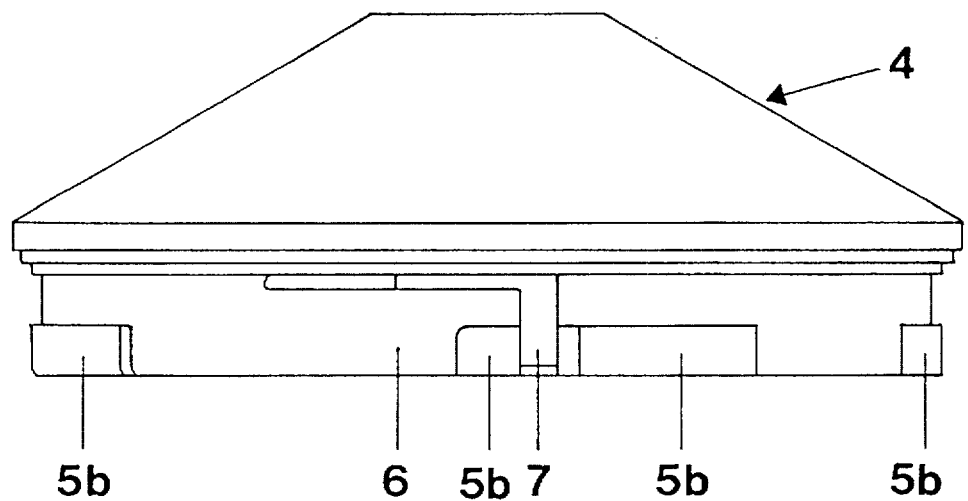
FIG. 2 is a schematic side view of the cover for the housing of FIG. 1.

An essentially frusto-conical cover 4 (FIG. 2) closes off the upper side of the housing 1. The interior of the housing 1 retains an electrical ballast, or accessory circuit (not shown) to operate the compact fluorescent lamp (not shown), adapted to be inserted in to the socket 3.

In accordance with a feature of the invention, the upper side of the inner wall of the housing is formed with a plurality of circumferentially interrupted ribs 5a, located equidistantly, along a circular line in the housing. The cover 4, likewise, is formed with ribs 5b located, with interruptions and equidistantly spaced from each other along a circular line. The length of the cover ribs 5b is slightly less than the spacing between the interrupted ribs 5a in the inner wall of the housing body 1. The ribs 5a, 5b form a bayonet connection between the cover 4 and the housing 1. Alternatively, the ribs can be along a spiral path, to form a screw connection.

In accordance with another feature of the invention, the cover 4 is formed with a resilient flap 6 which is delimited by a L-shaped recess 7 in the wall of the housing. The inner wall of the housing body 1 has a stop projection 8 formed thereon, which, upon assembly of the cover 4 on the housing body 1, snaps behind the flap 6 on the cover. The stop projection 8 is located in the inner wall of the housing in the region of the ribs 5a, and is matched to the resilient flap 6 on the cover. The flap 6 and the stop projection 8, together, form an interengaging snap-in connection or lock.

A circuit board 9, located on a ring-shaped shoulder 10 (FIG. 1) of the inner wall of the housing body 1 is provided for electrical contacts. The circuit board 9 is formed with a strain relief 11 for an electrical connecting cable which can be fitted through a central opening 12 in the cover 4. Additionally, the circuit board 9 has electrical terminals 13 for the respective connecting wires of the cable.

Figure 3:
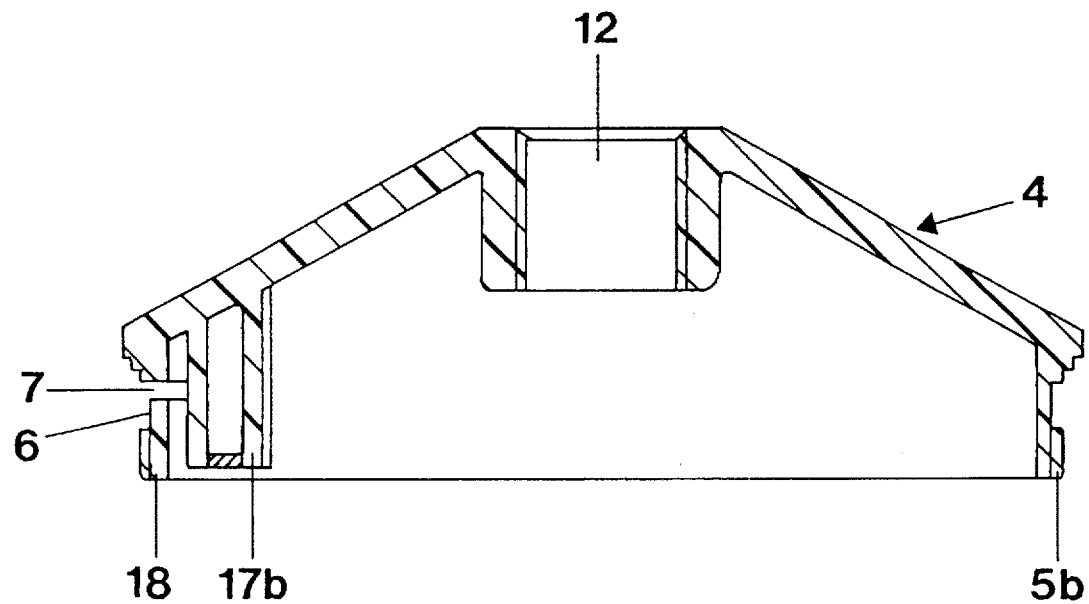
FIG. 3 is a schematic cross-section through the cover of FIG. 2.
Figure 4:
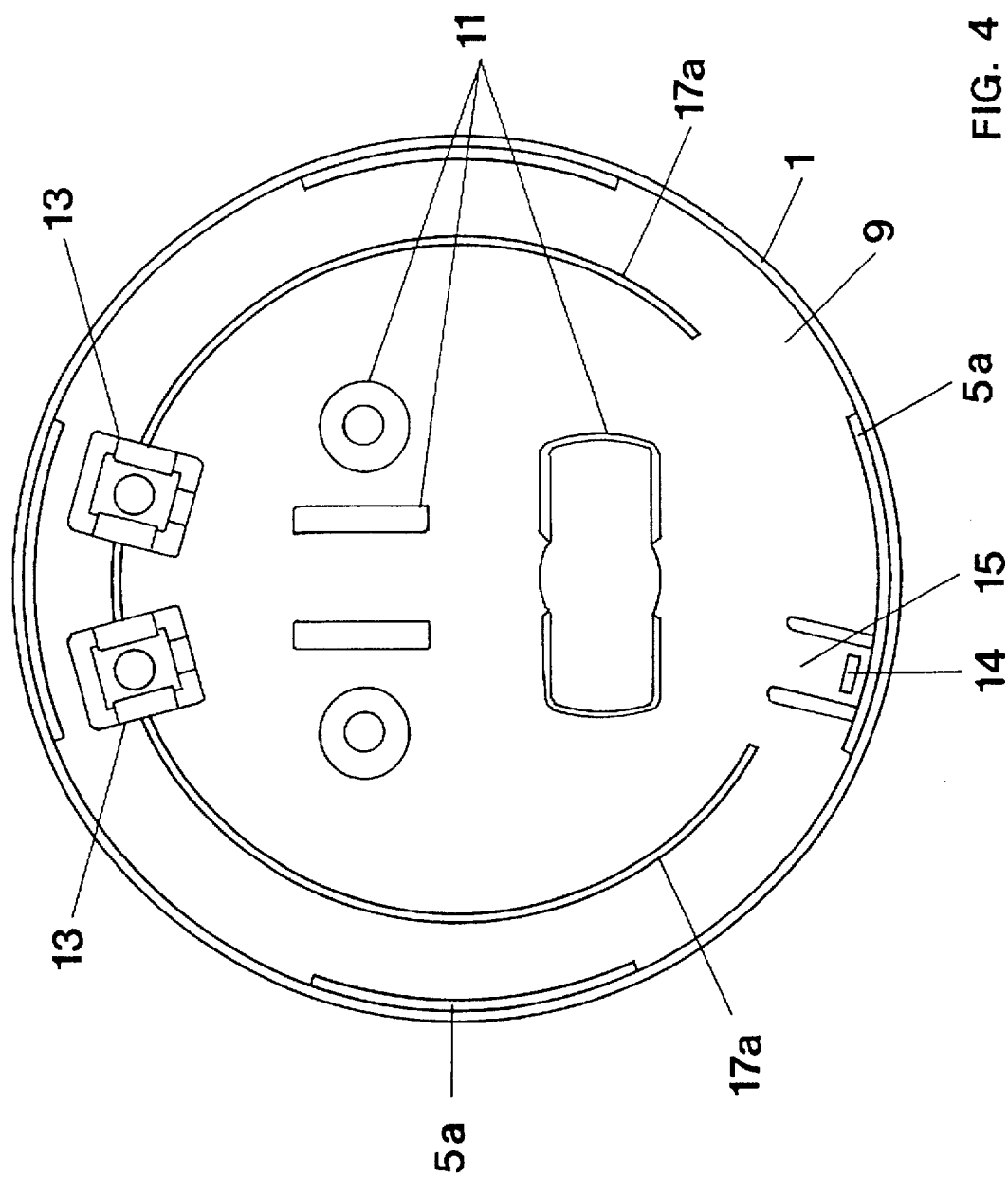
FIG. 4 is a schematic top view of the housing, with a connecting plate therein, with the cover removed, and without a connecting cable.

In accordance with another feature of the invention, a positioning rib 14 is located within the housing, for example secured to or part of the circuit board 9. The positioning rib 14 cooperates with the interengaging snap connection 6, 8. The positioning rib 14 is located on a spring tongue 15 punched out from the circuit board 9. Upon removal of the cover 4, the positioning rib 14 holds the resilient flap 6 in unlocked position, permitting disengagement of the snap connection 6, 8. The flap 6 is formed at its lower edge, in the region of its free end, with a notch 18 (FIG. 3) in which the positioning rib 14 can engage.

A narrow slit 16 is located in the wall of the housing body 1 in the region of the ribs 5a, immediately adjacent the stop projection 8. The slit 16 has a length of about 4 mm, and a width of about 1.5 mm. Starting from a central cylinder axis of the housing structure 1, and upon engagement of the cover 4 with the housing body 1, the positioning rib 14, the free end of the resilient flap 6, and the slit 16 are on a common radius. The screw-type connection, whether of bayonet or spiral form 5a, 5b, is associated with stop elements 17a, 17b, which limit the rotary movement of the cover 4, upon opening or closing of the cover, to about 80°, that is, just a little less than a quarter turn. The stops are formed by a ring segment 17a formed on the circuit board 9, and encompassing about 280°, and rib elements 17b, formed on the cover 4.

USE, ASSEMBLY AND DISASSEMBLY.

To close the housing, the cover 4 is so seated on the top side of the housing body 1 that the ribs 5b of the cover 4 fit in the spaces between the ribs 5a on the inner wall of the housing body 1. The cover and housing are then relatively rotated by about a quarter turn in clockwise direction (for closing). In this movement, the resilient flap 6 engages behind the stop projection 8. Rotation between the cover and the housing body 1 in disengaging direction are prevented, in other words, rotation of the cover 4 in counter-clockwise direction is inhibited.

It is not possible to open the housing merely by rotation. If the cover 4 is to be removed, it is first necessary to unlock the snap connection 6, 8. A tool, for example a screwdriver, is inserted in the small slit 16 in the housing 1. The resilient flap 6 is deflected by slight pressure on the flap 6, thereby bending it slightly backwardly, whereupon the positioning rib 14 engages on the notch 18 at the bottom side of the flap 6. This unlocks the snap connection 6, 8. The bent-back flap 6 is retained in its backwardly bent position. The screwdriver can then be removed, yet the flap remains fixed in its unlocked position. The cover 4 can then be rotated easily by about a quarter turn in counter-clockwise direction to open the rotary, that is bayonet, or screw connection 5a, 5b. The unlocked flap 6 will glide past the stop projection 8. At the same time, the tongue 15 is pressed downwardly by the lower edge of the cover 4, so that the positioning rib 14 and the flap 6 are separated from each other, and the cover can now be removed.

Various changes and modifications may be made, and the invention is not limited to the preferred embodiment described above. For example, cover 4 and housing 1 may have a spiral screw connection rather than the bayonet connection 5a, 5b, each formed by an inclined screw thread, or portions thereof, located at the outside of the cover and at the inside of the housing. The resilient flap 6 is then formed on the cover 4 in the region of the thread. The stop projection 8 is formed in the region of the thread at the inner wall of the housing. The shape and arrangement of the stop projection 8, the positioning rib 14 and the resilient flap 6 may conform essentially entirely to the example described.

The shape of the cover 4 and of the housing body 1 can be varied, so long as the respective interengaging screw-type connection and the snap connection is not essentially affected. For example, the frusto-conical cover 4 can be replaced by a flat disk-cover or the like. The circuit housing, and the connections are particularly simply and effectively used when the housing is of cylindrical shape; it may, however, also have a different shape, for example at the outside thereof.

Various other changes and modifications may be made within the scope of the inventive concept.

I claim:

1. Socket and socket housing for an electric lamp, and retaining an accessory circuit, or ballast for the lamp comprising a housing body (1) and a removable cover (4) therefor;
    an interengaging rotary connection (5a, 5b) on the cover (4) and body, respectively, for selective assembly, and disassembly of said body and cover;

an interengaging snap connection (6, 8) on said cover and body, said snap connection including a cover element (6) and a body element (8), respectively secured to said cover and said body, and engaging upon assembly of said cover (4) and said body;

a small release opening (16) formed in one of said cover and said body in the region of said snap connection to provide access for a removal tool to said snap connection for resilient deflection and release of one of said elements (6) from the other element (8); and a positioning rib (14) located for engagement with said one (6) of said elements upon resilient deflection thereof for retaining said one element in deflected position regardless of continued presence of said removal tool, and hence unlocked state of said snap connection, to permit removal of said cover (4) from the body (1).

2. The socket and socket housing of claim 1, wherein said interengaging rotary connection comprises projecting rib or thread portions formed, respectively, on the housing body (1) and on the cover (4).

3. The socket and socket housing of claim 1, wherein said rotary connection comprises a plurality of ribs (5a, 5b) located, respectively, on the cover (4) and on a fitting wall of the body (1), said ribs being circumferentially discontinuous, and so placed, respectively, on the body and on the housing that the ribs (5b) of the cover (4) can fit into the spaces between ribs (5a) formed on the body (1).

4. The socket and socket housing of claim 3, wherein the ribs (5a) located on the body are formed, equidistantly, along a circular line along the inner wall of the body (1); and wherein the ribs (5b) formed on the cover are equidistantly located on a circular line at an outer wall of the cover (4).

5. The socket and socket housing of claim 1, further including a stop member located in interfering position of said rotary connection to limit relative rotary movement between the body (1) and the cover (4).

6. The socket and socket housing of claim 1, wherein the body element (8) of the snap connection (6, 8) is formed by a projection, and the cover element (6) engages behind the projection formed by the body element (8) upon engagement of the snap connection when the cover (4) is closed on the body (1).

7. The socket and socket housing of claim 1, wherein at least one of said body (1) and said cover (4) comprise plastic material.

8. The socket and socket housing of claim 1, wherein both said body (1) and said cover (4) comprise plastic material.

9. The socket and socket housing of claim 1, wherein said body (1) has an essentially circular, cylindrical shape, and defines a bottom portion (2), said bottom portion including a socket (3) for reception of an electric lamp.

10. The socket and socket housing of claim 1, wherein said cover (4) is formed with a central opening (12) for an electrical connection cable.

11. The socket and socket housing of claim 10, further including an essentially circular circuit board or plate (9) located within the body (1) and beneath the cover (4), said circuit board or plate including cable strain relief means (11) and terminals for connection wires included in the cable.

12. The socket and socket housing of claim 11, wherein said positioning rib is located on the circuit board or plate (9).

13. The socket and socket housing of claim 12, wherein the circuit board or plate is formed with a resilient tongue (15), and said positioning rib is located on said tongue (15).

14. The socket and socket housing of claim 12, wherein the positioning rib (14), a free end of said cover element (6) and the release opening (16) are located on a common radius having its center in an axis of symmetry of the body (1).

15. The socket and socket housing of claim 1, adapted to receive a compact fluorescent lamp, wherein said socket and socket housing comprises a suspension lamp, said body (1) is formed with a socket dimensioned and shaped to receive the compact fluorescent lamp; and said accessory circuit or ballast is located within the body (1) of said socket and socket housing.

16. A suspension lamp, comprising the socket and socket housing of claim 1 wherein said cover (4) is formed with a central opening (12) for an electrical connection cable; and wherein said body (1) is formed with a receptacle or socket dimensioned and shaped to receive a compact fluorescent lamp, and said accessory circuit or ballast is located within the body (1) of said socket and socket housing.

17. The suspension lamp of claim 16, further including an essentially circular circuit board or plate (9) located within the body (1) and beneath the cover (4), and wherein said circuit board or plate includes cable strain relief means (11) and terminals for connection wires included in the cable.

* * * * *